(12) United States Patent  
Carlestam

(10) Patent No.: US 12,123,854 B2  
(45) Date of Patent: Oct. 22, 2024

(54) TEST SYSTEM AND METHOD FOR MEASURING AND CALCULATING HARDNESS OF MATERIAL

(71) Applicant: SSAB TECHNOLOGY AB, Stockholm (SE)

(72) Inventor: Anders Carlestam, Stockholm (SE)

(73) Assignee: SSAB TECHNOLOGY AB, Stockholm (SE)

( * ) Notice: Subject to any disclaimer, the term of this patent is extended or adjusted under 35 U.S.C. 154(b) by 502 days.

(21) Appl. No.: 17/414,545

(22) PCT Filed: Dec. 18, 2019

(86) PCT No.: PCT/EP2019/086018  
§ 371 (c)(1),  
(2) Date: Jun. 16, 2021

(87) PCT Pub. No.: WO2020/127531  
PCT Pub. Date: Jun. 25, 2020

(65) Prior Publication Data  
US 2022/0011207 A1    Jan. 13, 2022

(30) Foreign Application Priority Data  
Dec. 20, 2018    (EP) .................................... 18214413

(51) Int. Cl.  
*G01N 3/42* (2006.01)
(52) U.S. Cl.  
CPC ......... *G01N 3/42* (2013.01); *G01N 2203/008* (2013.01); *G01N 2203/0098* (2013.01); *G01N 2203/0647* (2013.01)

(58) Field of Classification Search  
CPC ............... G01N 3/42; G01N 2203/008; G01N 2203/0098; G01N 2203/0647  
See application file for complete search history.

(56) References Cited

U.S. PATENT DOCUMENTS 5,490,416 A    2/1996  Adler  
2022/0373442 A1*  11/2022  Khosla ...................... G06T 7/74

FOREIGN PATENT DOCUMENTS

| CN | 104122205 | 10/2014 |
| CN | 107 796 718 A | 3/2018 |
| CN | 108 195 697 A | 6/2018 |

(Continued)

OTHER PUBLICATIONS

International Search Report and Written Opinion were mailed on Feb. 19, 2020 by the International Searching Authority for International Application No. PCT/EP2019/086018, filed on Dec. 18, 2019 and published as WO 2020/127531 on Jun. 25, 2020 (Applicant—SSAB Technology AB) (16 Pages).

(Continued)

*Primary Examiner* — Matthew G Marini  
*Assistant Examiner* — Leo T Hinze  
(74) *Attorney, Agent, or Firm* — Ballard Spahr LLP

(57) ABSTRACT

A method and test system for calculating and evaluating hardness and other properties of a material are disclosed. The method and test system use a 3D measurement equipment to read a shape of an indent created on a surface of the material, process the topographic map of the indent and generate a profile of the indent together with a corresponding HB value.

18 Claims, 11 Drawing Sheets

(56) References Cited

FOREIGN PATENT DOCUMENTS

| | | |
|---|---|---|
| DE | 10 2008 034136 | 1/2010 |
| JP | S62056840 | 3/1987 |
| JP | H06005209 | 1/1994 |
| JP | H08201260 | 8/1996 |
| JP | H09210892 | 8/1997 |
| JP | 2016024079 | 2/2016 |

OTHER PUBLICATIONS

Germak, A. et al., "Investigations of new possibilities in the calibration of diamond harndness indenters geometry," Measurement, Institute of Measurement and Control, London, GB, vol. 44, No. 2, (Feb. 1, 2011) pp. 351-358.

\* cited by examiner

TEST SYSTEM AND METHOD FOR MEASURING AND CALCULATING HARDNESS OF MATERIAL

CROSS-REFERENCE TO RELATED APPLICATIONS

This application is a U.S. National Phase Application of International Application No. PCT/EP2019/086018, filed Dec. 18, 2019, which claims priority to European Application No. 18214413.9, filed Dec. 20, 2018, each of which are hereby incorporated by reference in their entirety.

TECHNICAL FIELD

Embodiments herein relate to a method and test system for measuring and calculating hardness of a material. In particular, they relate to using 3 Dimension measurement instrument in hardness test of a material and a method to calculating hardness of a material based on the 3D measurement data. Further they relate to computer product, test system and method therein for measuring hardness of a material.

BACKGROUND

Hardness is a characteristic of a material and is defined as a resistance to indentation, and it is determined by measuring a permanent depth of an indent. When using a fixed force or load and a given indenter or ball, the smaller the indentation, the harder the material. Indentation hardness value is obtained by measuring the depth or the area of the indentation using one of many different test methods. A hardness test method used to determine Brinell Hardness (HB) value was launched in 1900 and has been a standard method for industrial measuring hardness since then. The Brinell hardness test method is regulated by standard ISO 6506-2:2005, which specifies a method of verification and calibration of testing machines used for determining Brinell hardness.

A current use of the Brinell hardness method, in a heavy plate mill test house, comprises the following procedures:

a) A test piece is coming in from a mill, cut into 250 x250 mm test coupon, from 3 to 170 mm thickness;

b) The surface of the test coupon is machined in a dedicated milling machine to a depth of 0.5 to 2 mm dependent on thickness, in the center of the test coupon.

c) The test coupon is lifted by a robot from the milling machine into a HB measurement station;

d) The HB measurement station has a revolver solution that performs loading of indenter to create an indent on the test coupon, switching to optical reading of the indent, sending optical measuring data to a data system, moving to a new measurement position;

e) Typically three measurements are made for each test coupon; and f) The test coupon is moved by the robot to storage.

The Brinell hardness method is based on 2 Dimensional (2D) measuring on an indent, the evaluation of a 2D Brinell hardness measurement is show in Eq. (1):

$$HBW = \frac{0.102*2*F}{\pi*D*\left(D-\sqrt{(D^2-d^2)}\right)} \qquad \text{Eq. (1)}$$

Where
HBW: Hardness Brinell Wolfram carbide;
F: applied load or force (Newtons);
D: diameter of indenter or ball (mm);
d: diameter of indentation (mm).

There are several problems or weaknesses associated with the 2D HB test system described above. One is the optical reading of the indent. The reading is sensitive to the condition of the milled surface and to the light conditions. This is probably a major cause for scatter in the testing process. Harder material gives smaller indent and increased scatter and the method is not accurate enough for materials with hardness above 400 HB.

Harder material has more of a "crater" in the rim of the indent, which makes it hard to define the edge of the indent. Different material may have different types of rim-shapes.

Suppliers of Brinell test system are only promising an accuracy of 3% at 95% confidence, i.e. 2 standard deviations (2s).

This gives an accuracy of +/−12 HB at 2s and +/−18 HB at 3 standard deviations (3s) for a material with 400 HBW, e.g. a steel Hardox 400 from SSAB.

This gives an accuracy of +/−13.5 HB at 2s and +/−20 HB at 3s for a material with 450 HBW, e.g. a steel Hardox 450 from SSAB.

This gives an accuracy of +/−15 HB at 2s and +/−22.5 HB at 3s for a material with 500 HBW, e.g. a steel Hardox 500 from SSAB.

The surface of the test coupon needs preparation by milling or grinding since the optical reading can't be used on a non-prepared surface. So the traditional 2D Brinell hardness test method is a destructive method.

Another problem is volume of plasticization and deformation hardening of a material. The volume that is plasticized decreases with increasing hardness for a material and by this, the diameter of an indent on the material is not increasing linearly with the hardness.

The shape of the crater will be affected by the material's tendency to deformation harden. The indent springs back when the load is released, making a wider but shallower indent than the shape of the indenter ball. This is shown in FIG. 1. Further pile-up or sink-in of material at the crater rim, make definition of the indent diameter difficult. This is shown in FIG. 2.

Moreover, the material may be sensitive to how the surface is prepared. A grinding or milling operation has a tendency to heat up the surface and thereby temper the material and change the hardness. This effect may be as strong as a hardness change of 20 HB on quenched steel with 500 HBW level. The roughness of the surface has also a significant impact on the optical reading. Tool wear has also a significant impact on the final test result. In industrial applications this has to be well monitored, especially in machining of very high strength steel, where the tool wear is severe.

With these problems in the traditional 2D Brinell test system, test precision is not sufficient for hard materials. Round robin tests have been performed in three different labs at SSAB. All labs have approved equipment and are following the Brinell test standard, still a significant deviation, approx. +/−10 HB, on measured hardness value occurs for materials with a HB level above 450 HB between the labs.

SUMMARY

It is therefore an object of embodiments herein to provide an improved method and test system for hardness measurement of a material.

According to one aspect of embodiments herein, the object is achieved by a method for calculating a hardness value of a material according to claim 1. The method comprises the following steps:

receiving a set of raw data representing a 3D topography of an indent created on a surface of the material measured by an instrument;

generating a complete data set CDS from the set of raw data by processing the set of raw data based on measuring quality of the instrument;

converting the CDS to a 2D data set CDS_2D in an X-Y coordinate plane representing a 2D picture having a circle in the middle representing the indent;

dividing the CDS_2D into two data sets, a first data set CDS1 comprising data inside the circle, a second data set CDS2 comprising the remaining data outside the circle;

calculating a tilting factor based on the CDS2 in the X-Y coordinate plane;

generating a levelled complete data set CDS_L by adjusting the CDS with the tilting factor and from CDS_L generating a first levelled data set CDS1_L comprising data inside the circle, a second levelled data set CDS2_L comprising the remaining data outside the circle;

calculating a mean value ZL in Z-direction from the CDS2_L, the ZL represents an average height of the surface of the material;

defining a zero plane ZP, representing an original surface of the material by setting ZL value as a zero level in the CDS_L;

calculating a roughness value Ra1 of the material surface from CDS2_L;

generating a complete data set of indent CDSI from the CDS1_L by finding all data in the CDS1_L below the zero plane ZP, minus the Ra1;

selecting a sphere shape by calculating on all data values in CDSI with least squares, wherein a diameter of the sphere is refereed as Sphere_1 and an origin of the sphere on the X-Y plane is refereed as Origin of Sphere_1;

adjusting the CDS_L such that all data in the CDS_L are centered on the Origin of Sphere_1;

calculating a second diameter Diameter_2 of an intersection of the zero plane ZP and the sphere; and calculating a first Hardness Brinell value HB_1 based on the second diameter Diameter_2.

According to one aspect of embodiments herein, the object is achieved by a computer program product comprising computer program code for executing the method steps for calculating a hardness value of a material as described above.

According to one aspect of embodiments herein, the object is achieved by a computer readable medium having stored thereon computer program code for executing the method steps for calculating a hardness value of a material as described above.

According to one aspect of embodiments herein, the object is achieved by a method for measuring a hardness value of a material. The method comprises the following actions or steps:

creating an indent on a surface of the material;

measuring a 3D topography of the indent and generating a set of raw data comprising 3D data values in X-Y-Z direction;

inputting the set of raw data into a processing unit, wherein the processing unit comprises computer program code for performing the method steps for calculating a hardness value of a material when executed in the processing unit;

processing the set of raw data according to the method steps for calculating a hardness value of a material as described above; and outputting measurement results.

According to one aspect of embodiments herein, the object is achieved by a test system for measuring a hardness value of a material. The test system comprises a load with a ball for creating an indent on a surface the material; a 3D measurement instrument for measuring 3D topography of the indent and generating a set of raw data comprising 3D data values in X-Y-Z direction; a processing unit comprising computer program code for performing the method steps for calculating a hardness value of a material when executed in the processing unit. The test system may further comprise a display for outputting and indicating measurement results.

In other words, the embodiments herein provide a method and test system to evaluate classical Brinell indents by using of a 3D measurement equipment to read a shape of the indent, processing the topographic map of the indent by a new algorithm method and generating a profile of the indent with a corresponding HB value. By leveling the complete data set, scatters and errors in the measurements are removed and thereby improve evaluation quality on profile and hardness of the indent. So the embodiments herein calculate hardness with higher precision, especially on a material with higher hardness and smaller indents compared to a traditional standard 2D Brinell hardness test method. By defining a zero plane ZP and by setting ZL value as a zero level in the CDS_L, digital milling of the surface of the material is achieved. So the embodiments herein are in practice non-destructive hardness test since no milling or grinding process for surface preparation is necessary, and may be used to measure directly on e.g. a surface of steel as rolled.

The embodiments herein may provide some benefits for a steel mill, such as cost savings, improved yield, improved lead time and instant feedback, as well as possibility to test or check all produced plates.

The embodiments herein may contribute to a new standard of evaluating hardness as the first Hardness Brinell value HB_1 fulfils ISO 6506-1:2006 standard.

The embodiments herein may be used to calibrate material models used to predict materials behaviour in different applications.

The embodiments herein may be used to estimate yield strength, degree of deformation hardening and by pattern recognition estimate a state of microstructure of a material.

The embodiments herein may be developed to an industrial micro-Brinell method e.g. using a 1 mm ball on very thin material, less than 4 mm, where it can replace today's standard Vickers measurement. Vickers method is a lab standard and consists of indenting a test material with a pyramid shape diamond indenter. It is very cumbersome to perform and less accurate, as it demands time consuming sample preparation and the measured volume of steel is very small compared to the Brinell method based on ball indent.

The embodiments herein may be implemented as an in-line automatic hardness measuring station together with a production line at any production sites producing a material.

Therefore the embodiments herein provide an improved method and test system for hardness measurement of a material.

BRIEF DESCRIPTION OF THE DRAWINGS

Examples of embodiments herein are described in more detail with reference to attached drawings in which.

DETAILED DESCRIPTION

Figure 1:
FIG. 1 showing shallowing of an indent on a material due to spring back.
Figure 2:
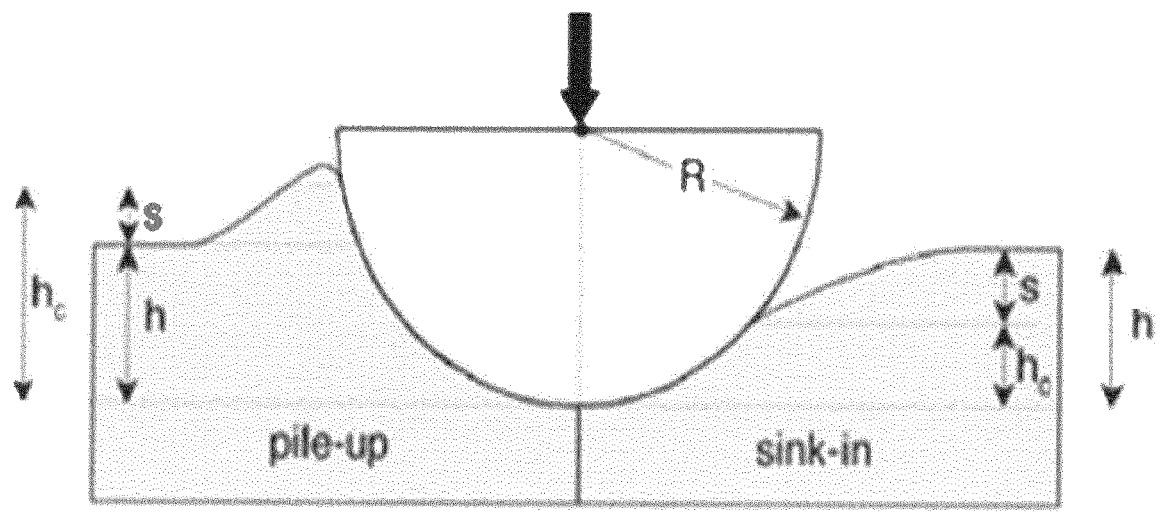
FIG. 2 showing an indent on a material with pile-up or sink-in at indent edge.
Figure 3A:
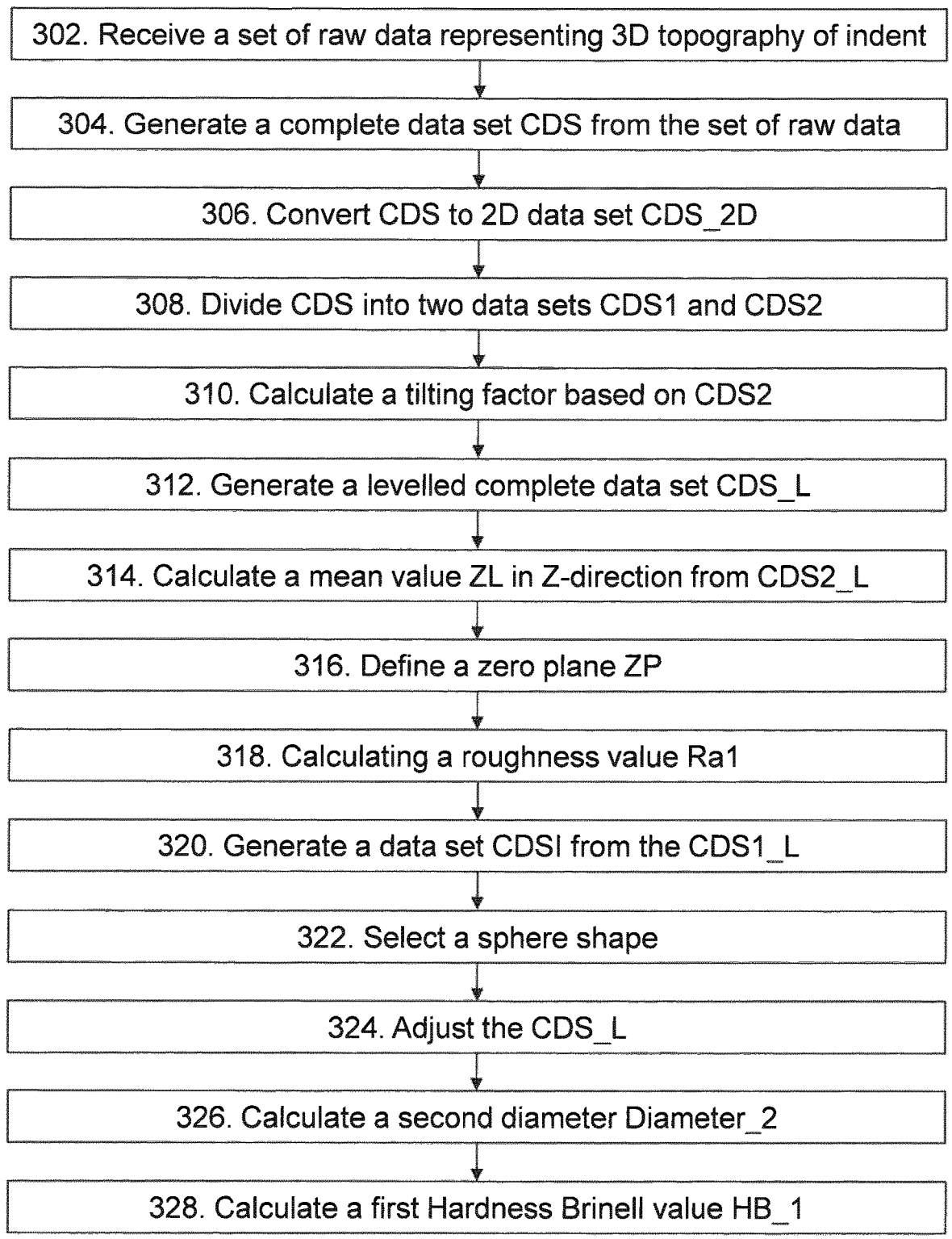
FIGS. 3a and 3b are flow charts illustrating a method according to embodiments herein.
Figure 3B:
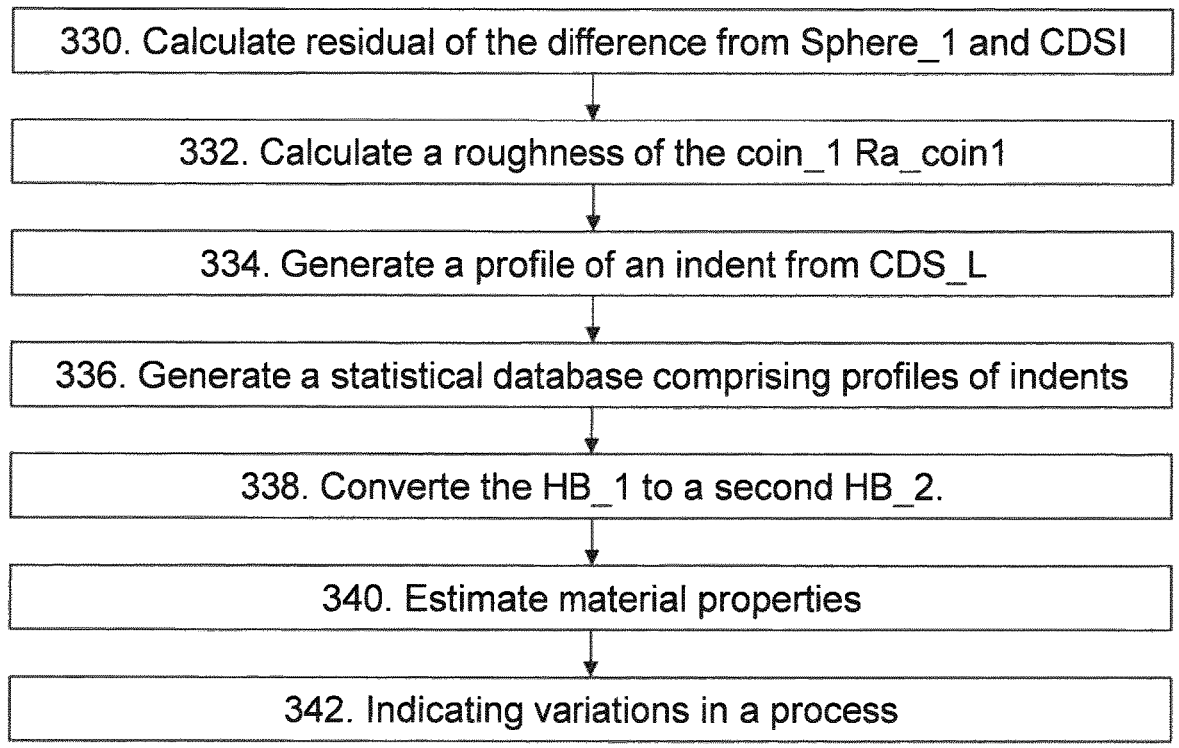

Example of embodiments of a method for calculating a hardness value of a material will now be described with reference to FIGS. 3a and 3b. As the method is based on 3D measurement data and is hereafter referred as a 3D hardness method according to embodiments herein. The method comprises the following actions or steps:

Action 302

Receiving a set of raw data CDraw representing a 3D topography of an indent created on a surface of the material measured by a 3D instrument. The 3D instrument may read the shape of the indent by any one of confocal microscope, line-laser, interference-method or other topographic method. The CDraw comprises 3D data values of X-value, Y-value and Z-value, i.e. in X-Y-Z direction. The measurement in X-Y direction has to be approximately 2 times longer than the diameter d of the final indent for calculating the Brinell hardness value.

Figure 4:
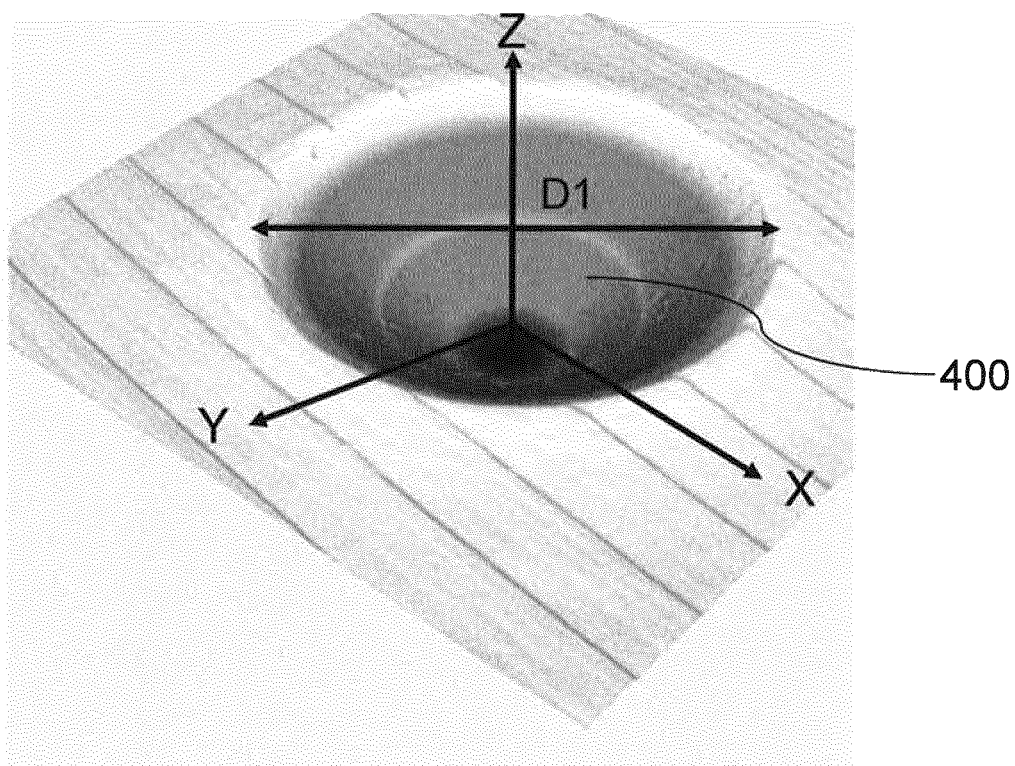
FIG. 4 illustrating an example of an indent created on a material surface.

FIG. 4 shows an example of an indent 400 created on a surface of a material illustrated in 3D of X-Y-Z direction.

Action 304

Generating a complete data set CDS from the set of raw data CDraw by processing the set of raw data based on measuring quality of the 3D instrument.

The set of raw data CDraw is washed or cleaned by removing outliers and filling in missing values. The washed data file is a theoretical representation of the actual indent herein referred to as the complete data set CDS. Outliers may be removed by a criteria of more than 3 standard deviations outside a mean Z-value of the CDraw, since the X-Y position of the indent is given by the coordinates and the X-value and Y-value have no scatter, but in z-direction, i.e. the direction of the indent, there may be missing values or outlier values present in the Z-value. Removed values and missing values in the CDraw may be filled by a mean value of a number of its nearest neighbors' values in the CDraw. The number of its nearest neighbors is a function of the quality of the incoming data and available computer power. The number of its nearest neighbor may be e.g. 30 and this number may be adjusted when tuning the evaluation program. The washing procedure may be adopted and tuned base on the quality of the CDraw. A key value called Harvest may be calculated as a percentage of usable data from the measurement, e.g. all data minus missing values and removed outliers. The quality of the CDraw is a function of the used 3D instrument. The Harvest level may be used to decide to scrap the evaluation process if the CDraw has low quality and also to keep track of the quality of the instrument over time.

Action 306

Converting the CDS to a 2D data set CDS_2D in an X-Y coordinate plane. This may be performed by generating a 2D picture of X-Y coordinates with the z-value as an intensity or Grey level. By removing all values above the average Grey level, the major part of the observations in the indent will be removed, and will appear as a circle in the middle of the picture, approximately the size of the indent. A circle shape is fitted to the rim of this, generating a first diameter D1 and the x-y coordinates of the 2D circle. FIG. illustrates the CDS_2D with the circle 500. The first diameter D1 is approximately the diameter of the indent 400. The purpose of this 2D conversion is to find the approximate rim of the indent and use this to divide the 3D data set in two data sets, inside and outside the circle 500.

Action 308

Figure 5:
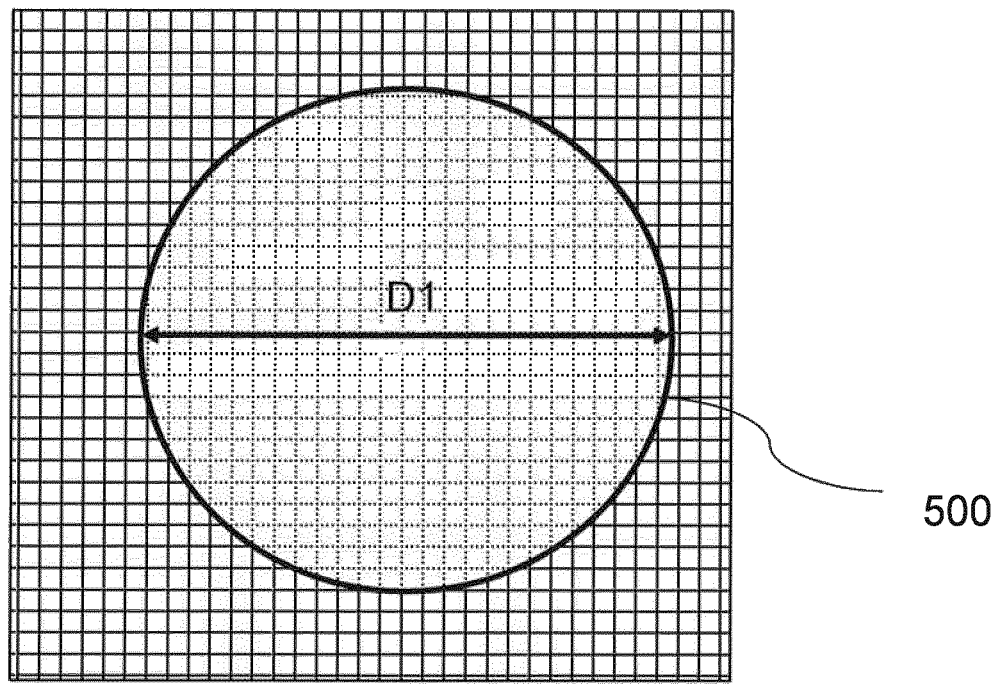
FIG. 5 illustrating a 2D data set according to embodiments herein.

Dividing the CDS into two data sets by using the X-Y coordinate of the circle 500 in CDS_2D as shown in FIG. 5, a first data set CDS1 comprising data inside the circle 500, a second data set CDS2 comprising the remaining data outside the circle 500. A small overlap of the data, approx. 3% of the diameter D, i.e. in an order of the scatter of the first diameter D1, from CDS1 versus CDS2 may be applied.

Action 310

Calculating a tilting factor based on the second data set CDS2 in the X-Y coordinate plane. There may be any unwanted tilting of the indent in the X-Y direction due to measurement errors, which may affect the final evaluation of the indent profile. The tilting factor may be calculated by a least squares method in the X-Y coordinate plane.

Action 312

Generating a levelled complete data set CDS_L, by adjusting the CDS with the tilting factor and from this regenerating a first levelled data set CDS1_L comprising data inside the circle, a second levelled data set CDS2_L comprising the remaining data outside the circle. By levelling the complete data set, the profiles will be more symmetrically distributed around the origin and can be handled as polar coordinates.

Action 314

Calculating a mean value ZL in Z-direction, i.e. in a direction of the indent, from the CDS2_L. The mean value ZL represents an average height of the surface of the material.

Action 316

Defining a zero plane ZP representing an original surface of the material by setting ZL value as a zero level in the CDS_L. This process corresponds to a digital milling of the surface of the material. So the embodiments herein are in practice non-destructive hardness test since no milling or grinding process for surface preparation is necessary, and may be used to measure directly on e.g. a surface of steel as rolled.

Action 318

Calculating a roughness value Ra1 of the material surface from CDS2_L. A roughness value may either be calculated on a profile, i.e. line, or on a surface, i.e. area. There are many different roughness parameters in use, but Ra is by far the most common one. Each of the roughness parameters may be calculated using a formula for describing the surface. The profile roughness parameters are included in BS EN ISO 4287:2000 British standard, identical with the ISO 4287:1997 standard. The standard is based on the mean line "M" system.

Ra is the arithmetic average value of filtered roughness profile determined from deviations about a center line $y_i$ within an evaluation length n, calculated as in Eq. (2):

$$R_a = \frac{1}{n}\sum_{i=1}^{n} |y_i| \qquad \text{Eq. (2)}$$

Action 320

Generating a complete data set of indent CDSI from the CDS1_L by finding all data in the CDS1_L below the zero plane ZP, minus the Ra1. This data set CDSI has only observations relevant for the indent, i.e. values from the plate surface are omitted. So CDSI is a completed data set of the indent with high quality.

Action 322

Figure 6:
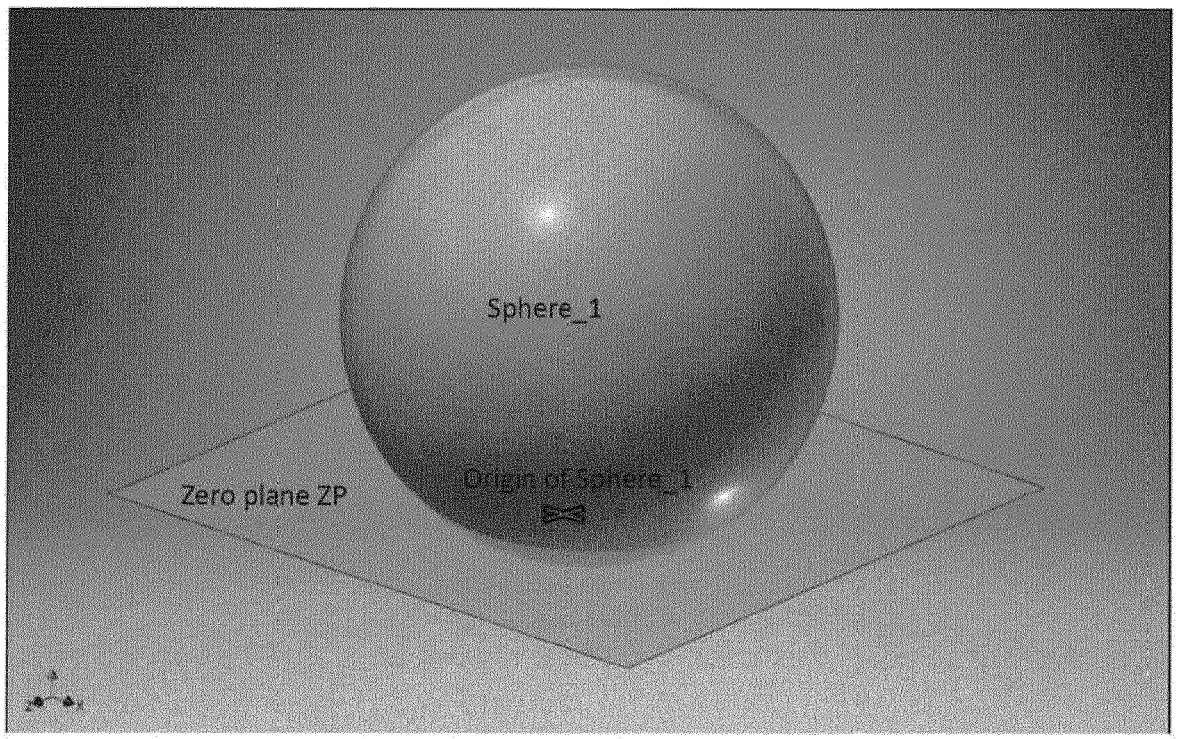
FIG. 6 illustrating a zero plane and a sphere according to embodiments herein.

Selecting a sphere shape by calculating on all data values in CDSI with least squares method, wherein a diameter of the sphere is refereed as Sphere_1 and an origin of the sphere on the X-Y plane is refereed as Origin of Sphere_1. The method of least squares is a standard approach for data fitting. FIG. 6 shows the sphere shape with diameter Sphere_1, the zero plan ZP and the origin of the sphere on the X-Y plane.

The Sphere_1 is different from the Brinell ball diameter that made the indent, as it is adjusted to fit the actual data of the indent, in most cases a larger diameter than the Brinell ball diameter as the indent is wider due to the spring back effect.

Action 324

Adjusting the CDS_L such that all data in the CDS_L are centered on the X-Y-Origin of Sphere_1. This step is necessary in order to generate a profile of the indent from polar coordinates.

Action 326

Figure 7:
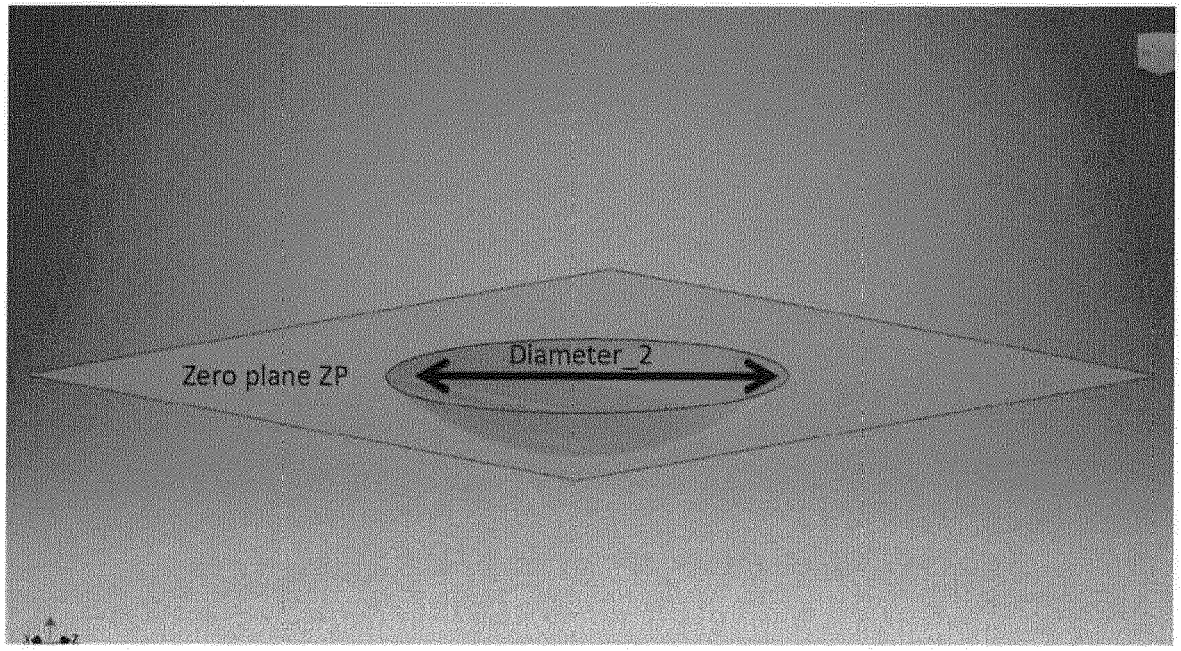
FIG. 7 illustrating intersection of the zero plane ZP and the sphere with diameter Sphere_1.

Calculating a second diameter Diameter_2 of an intersection of the zero plane ZP and the sphere shape. FIG. 7 shows the intersection of the zero plane ZP and the sphere shape. This diameter Diameter_2 is used to calculate a first HB value HB_1. This step is the most vital operation in this procedure, as in prior art solution, the focus has been to calculate the diameter based on finding the edge of the indent. Here the focus is to calculate the diameter based on the origin and shape of the indent by utilizing all available data.

Action 328

Calculating a first Hardness Brinell value HB_1 based on the second diameter Diameter_2 by Eq. (1), where the diameter of indent d is replaced with Diameter_2.

The HB_1 value is a very solid description of the hardness as it is based on all data from the measurements, except it doesn't utilize the information of the surface, i.e. values from the plate surface are omitted, since the Sphere_1 is only fitted to the values below the zero plane. This HB_1 value can't directly be used as a delivered output; even if it fulfills all demands on reading a diameter of an indent according to the Brinell standard. This HB_1 value will have an offset from the hardness value generated by a traditional 2D hardness test process. This may cause a minor problem when a traditional test process should be replaced. However, in a long term, this new HB_1 value may be the standard. At this stage, this HB_1 value will be used as a start value of the finally reported HB value, that is based also on the information from the surface, i.e. measurements above the zero plane.

In order to convert the HB_1 value to a corresponding HB value measured by the traditional standard 2D hardness test process and evaluate other properties of a material and recognize a material, the method may further comprise the following actions or steps:

Action 330

Calculating a residual of the difference from Sphere_1 and the CDSI. The residual volume has a similar shape as a coin and is referred as coin_1. The coin_1 data will be a measurement of how well the Sphere_1 fits to the actual data.

Action 332

Calculating a roughness Ra_coin1 of the coin_1. The Ra_coin1 value may be used to check the quality of the measurement. Quality check of a measurement may be performed by checking if Ra_coin1 is within a certain limit or threshold. If the check is not approved, i.e. Ra_coin1 is larger than the threshold, indicating a bad fit of the Sphere_1 and a non-perfect shape of the indent, the measurement is discarded. This quality check is very important to allow implementation of fully automated test systems.

Action 334

Figure 8:
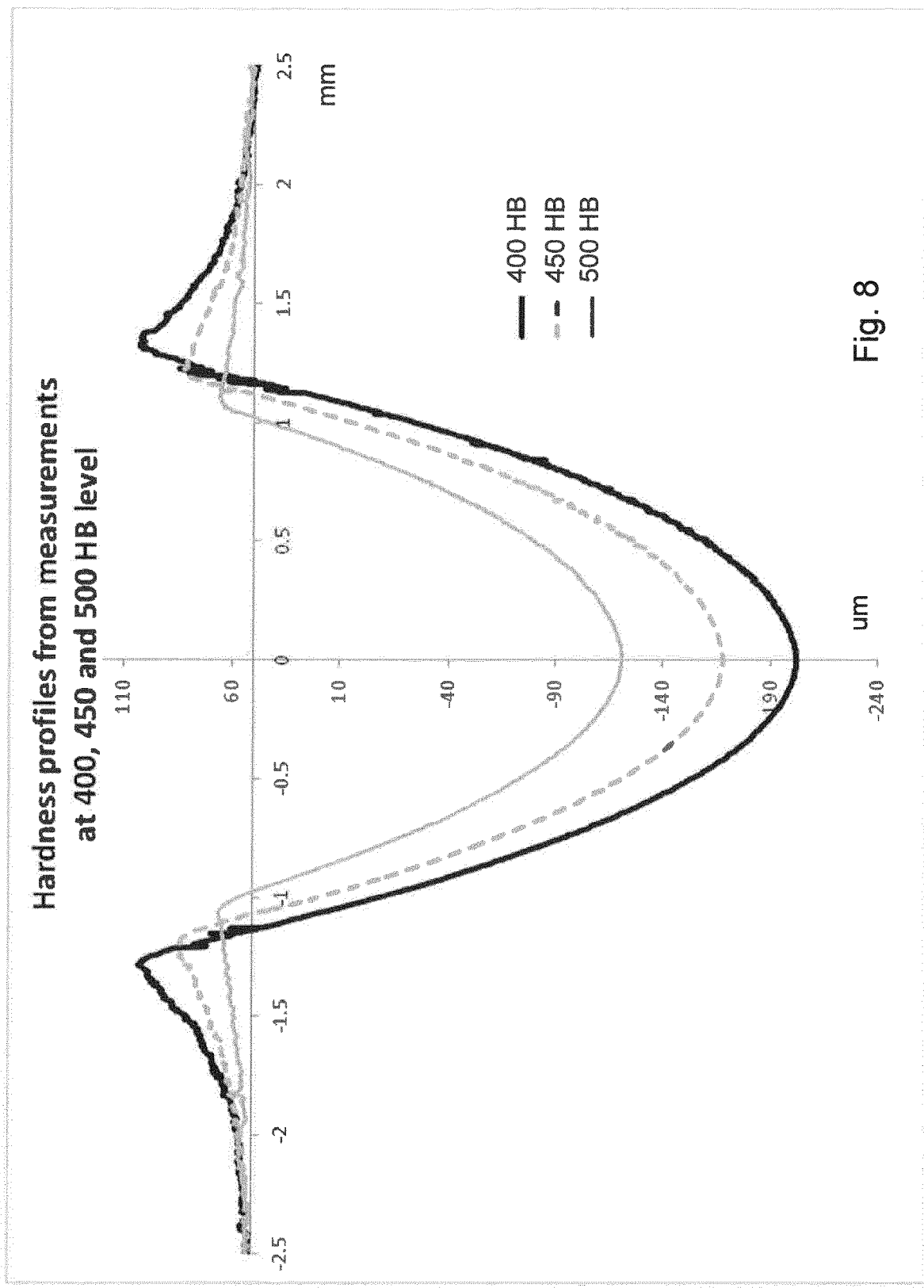
FIG. 8 illustrating examples of indent profiles.

Generating a profile of an indent. The profile of an indent is generated from the CDS_L in polar coordinates. The CDS_L is the complete measurement, adjusted for missing values, outliers and levelled. All data points in the CDS_L are used to generate the profile. FIG. 8 shows three examples of typical profiles of indents for 400 HB, 450 HB and 500 HB steels. The profile of an indent also comprises load and ball diameter used to create the indent and the calculated first Hardness Brinell value HB_1. The profile file has the same length, half the width of the CDS_L file, as it is symmetrical around the origin.

Action 336

Figure 9:
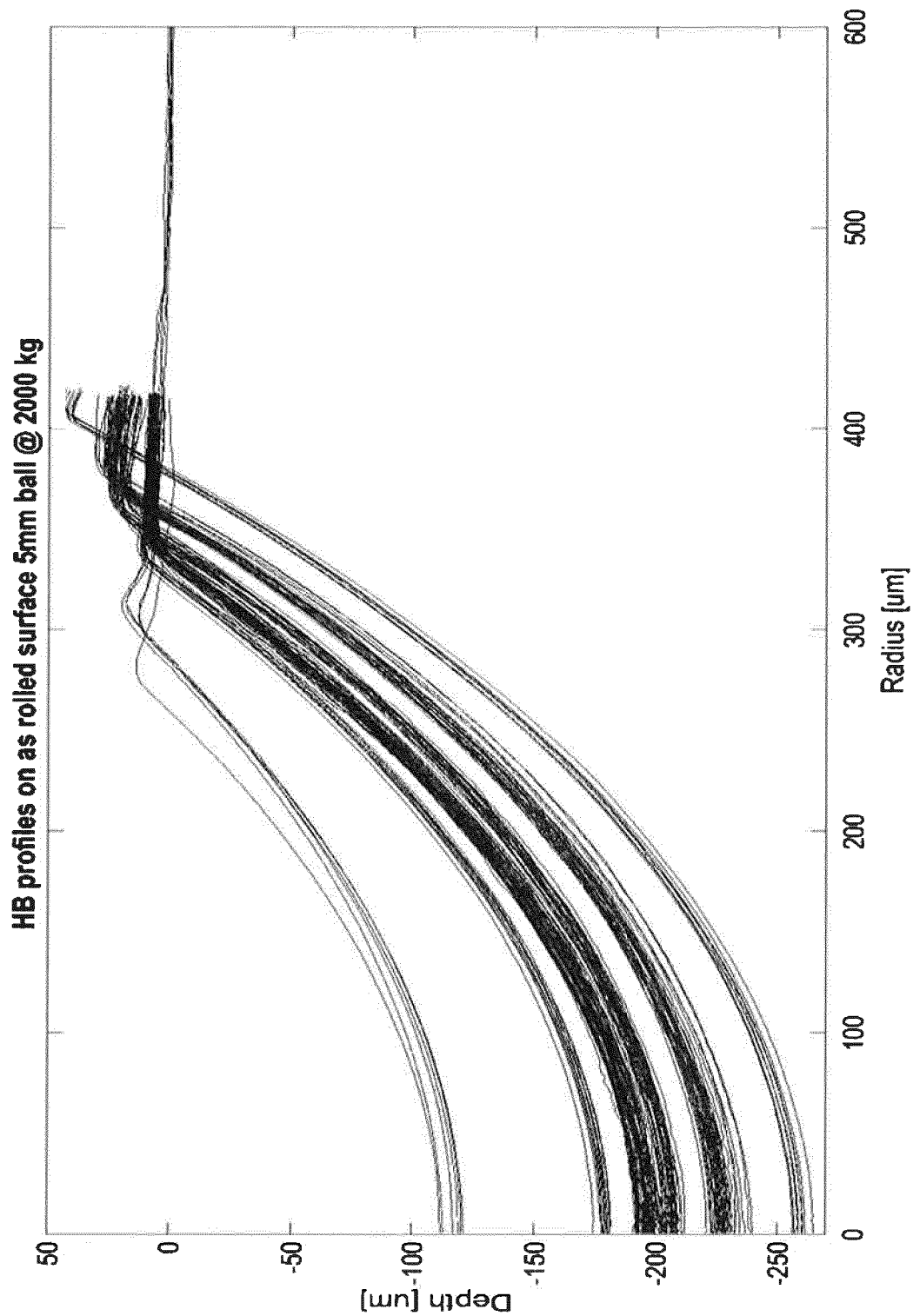
FIG. 9 illustrating examples of indent profiles for a large volume of materials.

Generating a statistical database comprising profiles of indents measured and generated from large volumes of materials with different hardness levels. The indents may be created by different load and ball sizes combinations on different materials. FIG. 9 shows examples of indent profiles of large volumes of materials with different hardness levels. The profiles are generated from martensitic steel with different loads and ball diameters.

In order to compare, corresponding profiles of indents measured and generated by a standard 2D Brinell hardness measurement may be included into the statistical database. The 2D profiles of indents comprise HB values measured with the standard 2D Brinell hardness method, loads and ball diameters used to create the indents.

Other information on the properties of a material, such as data on chemistry of a steel, thickness of a steel, condition of a steel, e.g. as rolled, quenched, tempered etc., may also be included into the statistical database.

Action 338

Converting the HB_1 to a second Hardness Brinell value HB_2. Both HB_1 and HB_2 fulfil ISO 6506-1:2006 standard. The HB_2 value corresponds to the same average value of hardness measured by the traditional standard 2D Brinell hardness evaluation method. Both HB_1 and HB_2 will show higher accuracy especially on hardness levels above 400 HB. The HB_2 value also has the feature of prediction other material properties.

There are many different statistical tools to converter the HB_1 to the HB_2 or connect the indent profile generated by the 3D hardness method according to embodiments herein to an expected normal result from the traditional 2D Brinell hardness method.

According to some embodiments herein, converting the HB_1 to HB_2 may be performed by evaluating the statistical database of indents profiles by Principal Components Analysis (PCA) to make a predictive model.

The PCA is a statistical procedure that uses an orthogonal transformation to convert a set of observations of possibly correlated variables, i.e. entities each of which takes on various numerical values, into a set of values of linearly uncorrelated variables called principal components.

Figure 9A:
FIG. 9A illustrating examples of predicted volume profiles for 6-16 martensitic plates.

The indents profiles e.g. shown in FIGS. 8 and 9 are depth by radius profiles. It is found out that using volume profiles to train the PCA model, instead of the depth profile, gives a stronger statistical model and also a more straight forward presentation, e.g. a change in volume is much stronger correlated to a change in hardness, than just a change in radius as in the traditional 2D method. Therefore, to convert the HB_1 to HB_2 the indents profiles is converted to accumulated volume by radius profiles. This transformation will simplify the evaluation. A model based on PCA is generated from the data base containing measured profiles with 3D and corresponding 2D values from the same sample. The tuned model can predict a typical shape of a hardness level, see FIG. 9A, where each line represents a profile with corresponding hardness value, e.g. from 350 to 700. By this, a reference set of volume profiles is generated. When evaluating a new measured profile, the measured profile is matched to this reference set of profiles and the nearest line of the hardness value is reported as the new HB_2 value.

The difference from the HB_1 versus HB_2 value is that the complete profile is used for HB2 and it is statistically trained on the profile database, to give the same average value as the standard 2D evaluation, whereas with less scatter. The HB_2 value is the HB value reported out from the 3D hardness method according to embodiments herein, and is refereed as a new 3D HB value.

This procedure may also be used to prove that the new 3D HB value correlates to the old 2D HB value in an independent measurement. The T-vectors of the PCA fit may be exported as a statistical model that may be used separately from the software for generating and evaluating the profile database. The statistical model may be continuously improved, taken into account the new profiles generated by the 3D hardness method, as long as a parallel and standard Brinell measurement in 2D following ISO 6506-1:2006 exists.

According to some embodiments herein, the method may further comprise estimating 340 any one of the material properties such as yield strength, modulus of elasticity (e-modulus), also referred to as Young's modulus, deformation hardening and level of plasticity by using Finite Element Analysis (FEA), e.g. Hooke's law of continuous media and von Mises yield stress criterion, based on the statistical database of profiles and by backward engineering.

Figure 10:
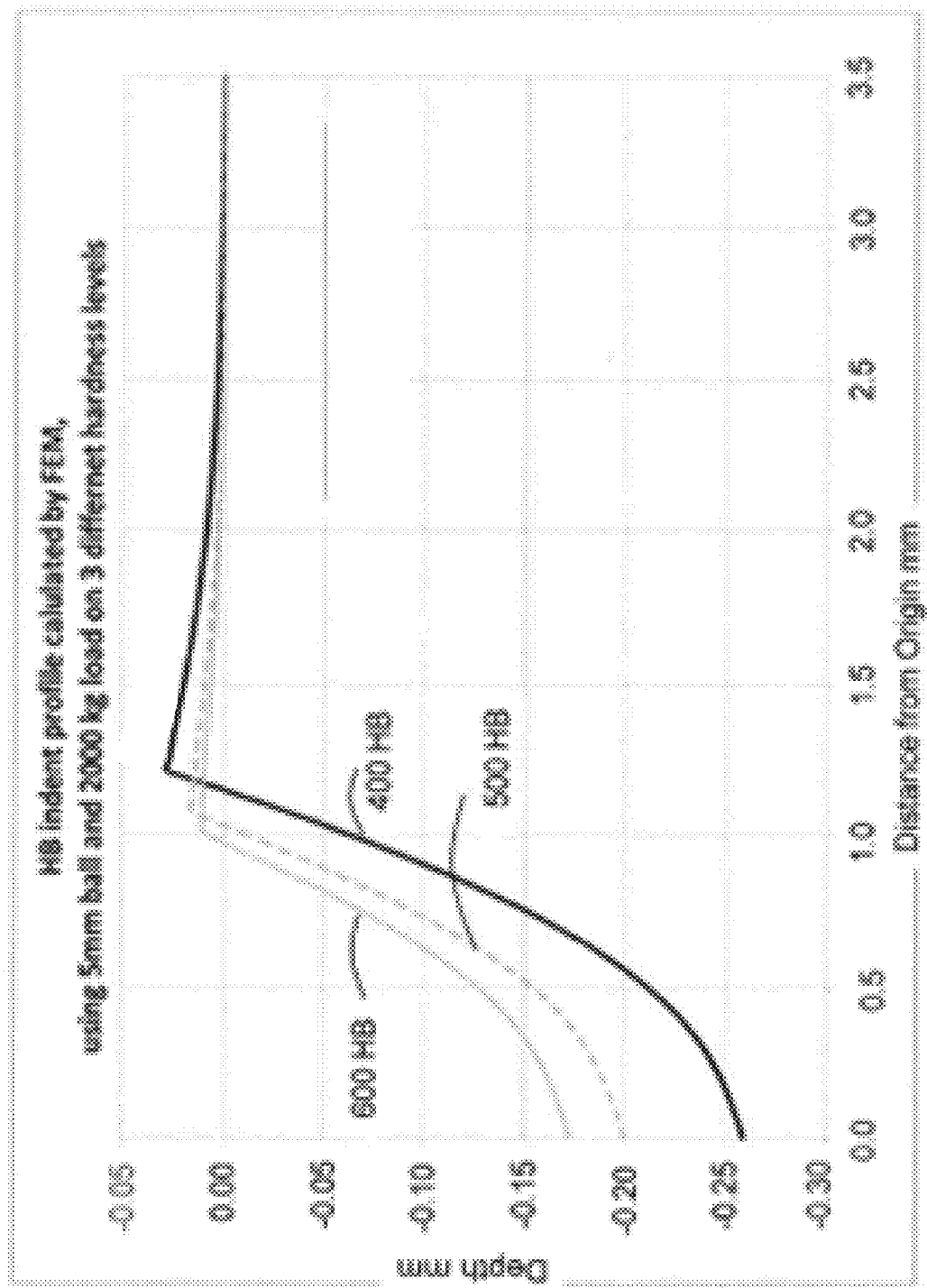
FIG. 10 illustrating examples of indent profiles calculated by Finite Element Analysis method.

FIG. 10 shows an example of HB indent profile calculated by FEA method, where the indent is created by using 5 mm ball and 2000 kg load on materials with three different hardness levels. From the profile, one can see pile-up indicated by the arrow. This is caused by lack of deformation hardening.

Figure 11:
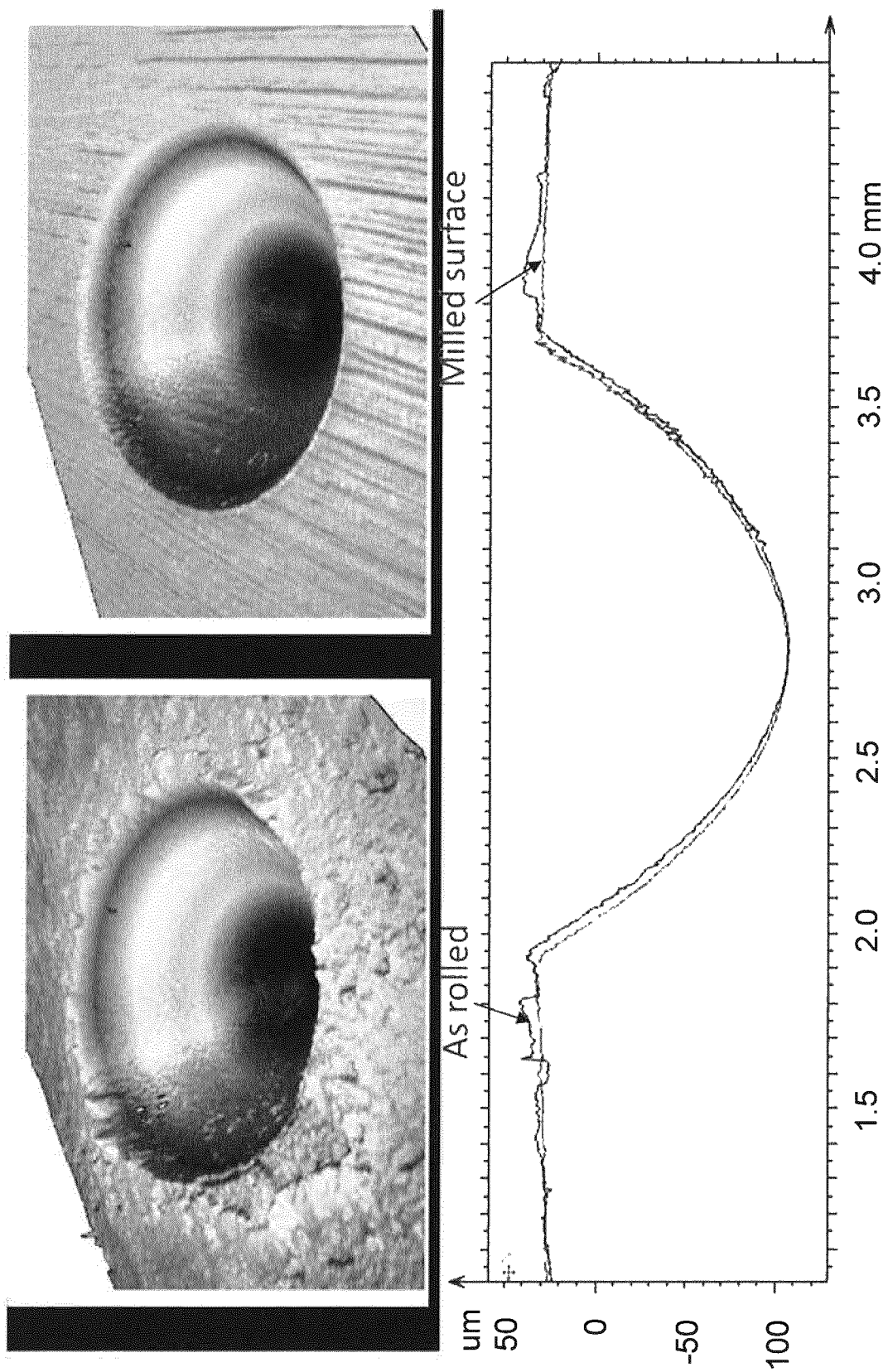
FIG. 11 illustrating an example of output indent profiles for different surfaces according to embodiments herein.

FIG. 11 shows profiles of indents for a material on as rolled and milled surface, from which it can be estimated which condition the material is in, e.g. rolled, quenched, tempered etc.

According to some embodiments herein, the method may further comprise indicating 342 variations in a process of making the material by checking if a profile of an indent is within a certain limit. That is the profile may be used to check that a typical indent profile of a material is within a certain limit, and by this recognize changes in the process at a higher sensitivity than just a HB value.

The embodiments herein for calculating the hardness value of a material, generating a statistical database comprising profiles of indents, and evaluating the statistical database may be implemented in a processing unit comprising computer program code for performing the functions and actions of the embodiments herein. The program code mentioned above may also be provided as a computer program product, for instance in the form of a data carrier carrying the computer program code for performing the embodiments herein. One such carrier may be in the form of a CD ROM disc. It is however feasible with other data carriers such as a memory stick. The computer program code may furthermore be provided as pure program code on a server or a cloud.

Figure 12:
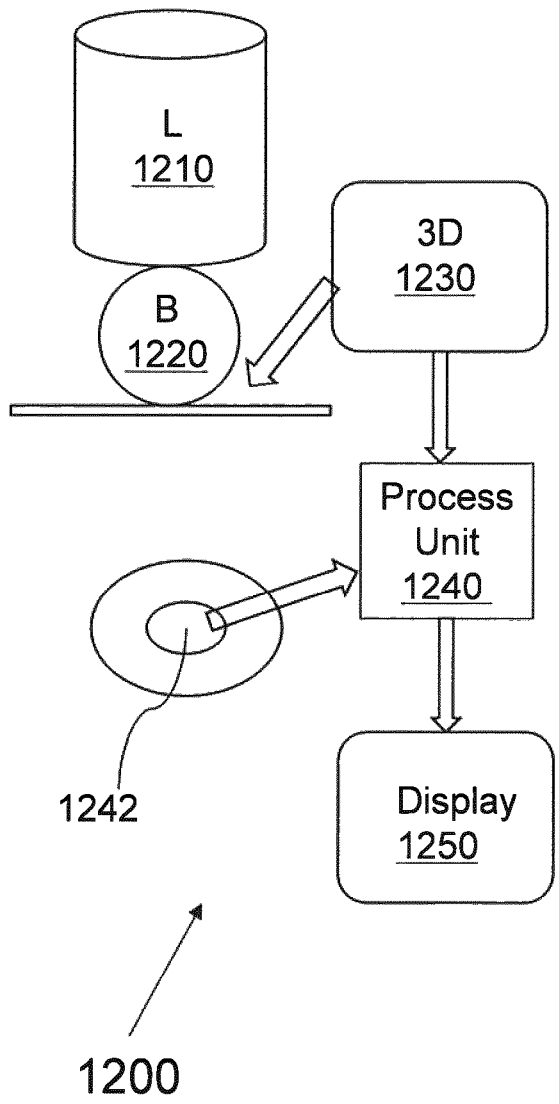
FIG. 12 is a schematic block diagram illustrating a test system according to embodiments herein.
Figure 13:
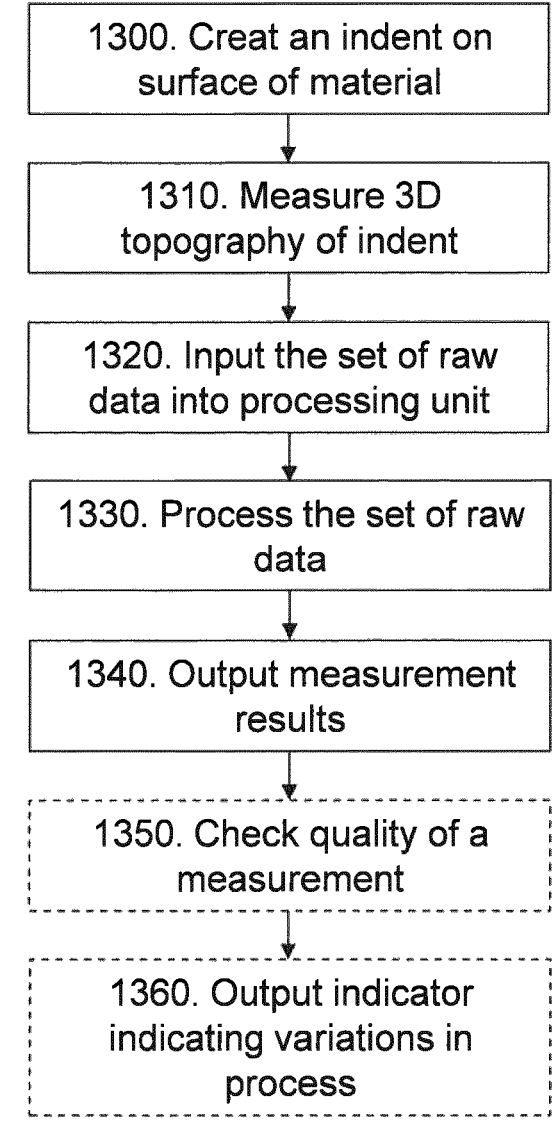
FIG. 13 is a flow chart illustrating a method performed in a test system according to embodiments herein.

According to some embodiments herein, a test system and method performed in test system for measuring a hardness value of a material will now be described with reference to FIGS. 12-13.

The test system 1200 comprises a load 1210 with an indenter 1220 for creating an indent on a surface the material. The indenter 1220 may have a shape of a ball. The shape of a ball is the most efficient when measuring at the scale of 2-3 mm. However, other shape of indenter is also possible, such as diamond pyramid, knop. The ball may have different sizes and may be mounted in a tool and switched automatically if a revolver solution is used or switched manually.

The test system 1200 further comprises a 3D measurement instrument 3D 1230 for measuring 3D topography of the indent and generating a set of raw data comprising 3D data values in X-Y-Z direction.

The test system 1200 further comprises a processing unit 1240 comprising computer program code 1242 performing at least one of the method steps 302-341 for calculating a hardness value of a material described above when executed in the processing unit 1240.

The test system 1200 may further comprise a display 1250 for outputting and indicating measurement results.

The test system 1200 may be implemented as an in-line automatic hardness measuring station together with a production line of the material at any production sites.

The test system 1200 may be operated fully automated and the final test results may be sent to a process control system of the production line. However a Human-Machine Interface (HMI) may be needed for maintenance and development operations.

The evaluation of the test results from the test system 1200 may be made in a supervision system or in the process control system of the production line, where rules for approval and rules for exception handling etc. are stored. For example, if a product plate that has a measurement that fulfills the quality requirements and gives a value within certain limits of the product, the product plate will be approved and will continue its process route. If the quality requirement is not fulfilled, the measurement may be repeated on the product plate in a new position. If the measurement fulfills the quality requirement but is outside hardness limits for the product, the measurement may be repeated according to rules for a secondary check of hardness. If the plate fails also at the secondary check, the plate may be rejected and may be re-routed by the process control system.

The test system 1200 may also be built as an off-line system for lab environment.

According to some embodiments herein, the method for measuring a hardness value of a material performed in the test system 1200 comprises the following actions or steps:

Action 1300

Creating an indent on a surface of the material.

Action 1310

Measuring a 3D topography of the indent and generating a set of raw data comprising 3D data values in X-Y-Z direction.

Action 1320

Inputting the set of raw data into a processing unit. The processing unit comprises computer program code for performing any one of the method steps 302-342 for calculating a hardness value of a material described above when executed in the processing unit.

Action 1330

Processing the set of raw data according to any one of the method steps 302-342 described above.

Action 1340

Outputting measurement results. The measurement results may be a first Hardness Brinell value HB_1, a second Hardness Brinell value HB_2. The HB_2 value is converted from the HB 1 value and both HB_1 and HB_2 fulfil ISO 6506-1:2006 standard. The HB_2 value corresponds to the same average value of hardness measured by a traditional standard 2D Brinell hardness evaluation method. Any one of the first Hardness Brinell value HB_1 and second Hardness Brinell value HB_2 or both may be outputted from the test system.

The method may further comprise the following actions:

Action 1350

Checking quality of a measurement by checking the parameter Ra_coin1.

Action 1360

Outputting an indicator, indicating variations in a process making the material.

Table 1 shows verification results of the 3D hardness method according embodiments herein for approximate 600 hundred samples with different types of surface. It can be seen that the 3 sigma deviation, i.e. the min and max of the observations, of the measured hardness is less than 2%. C.V value in Table 1 represents the standard 1 sigma deviation divided by the average, e.g. the standard deviation in percentage and the typical 1 sigma deviation is approx. 1%. These numbers are significantly lower than traditional 2D test method.

TABLE 1

| Surface type | 3 sigma (max/min value) | C.V |
|---|---|---|
| Milled | ~2.0% | ~1.0% |
| Mill scale | ~1.5% | ~0.8% |

To summarize, the method and test system according to embodiments herein provide at least the following advantages:

Providing accurate and higher precision hardness measurement results by HB_1 and HB_2 values, especially for the material with higher hardness over 450 HB and smaller indents;

Providing high accuracy indent profiles enabling using them to evaluate material properties and calibrate material models;

By a combination of the HB_1 value, the HB_2 value, the key values, e.g. Ra_coin1 for quality check and the complete profile, monitoring of production quality in a steel mill may be improved;

By removing the need of a test sample and a sensitive milling process, the accuracy, the test frequency and the feedback time may be improved significantly; and Providing many benefits for a steel mill, such as cost savings, improved yield, improved lead time, instant feedback, possibility to test or check all produced plates etc., since the test system may be implemented as an in-line automatic hardness measuring station together with the product processing line.

There are also some other advantages and potentials, such as:

The embodiments herein may, as long as a sensor can read 3D topography, also be used on milled or grinded surface and on any material.

The embodiments herein may also be extended to evaluate indents with very small diameters, e.g. 1 mm and beyond, created by small loads and ball size, as long as the 3D measuring tool has sufficient resolution.

The embodiments herein may be applied to thin steel gauges, e.g. under 3 mm, which are currently checked for hardness by using Vickers measurement which needs lab preparation or by translated results from tensile test.

The embodiments herein may be developed to an industrial 3D micro-Brinell method, e.g. using a 1 mm ball to create an indent.

The embodiments herein also opens up for using higher loads on very hard materials, as the current standard of using 3 ton on a 10 mm ball has too low degree of plasticization for steel above 450 HB.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method for calculating a hardness value of a material, the method comprising:

causing an indenter with a load to create an indent on a surface of a material;

causing an instrument to measure the indent created on the surface of the material by the indenter to generate a set of raw data representing a three-dimensional, 3D, topography of the indent created on the surface of the material;

generating a complete data set, CDS, from the set of raw data by processing the set of raw data based on measuring quality of the instrument;

converting the CDS to a two-dimensional, 2D, data set, CDS_2D, in an X-Y coordinate plane representing a 2D picture having a circle in the middle representing the indent;

dividing the CDS into two data sets by using the X-Y coordinate of the circle in CDS_2D, a first data set, CDS1, comprising data inside the circle, a second data set, CDS2, comprising the remaining data outside the circle;

calculating a tilting factor based on the CDS2 in the X-Y coordinate plane;

generating a levelled complete data set, CDS_L, by adjusting the CDS with the tilting factor and regenerating from CDS_L, a first levelled data set, CDS1_L, comprising data inside the circle, a second levelled data set, CDS2_L, comprising the remaining data outside the circle;

calculating a mean value, ZL, in Z-direction from the CDS2 L, wherein the ZL represents an average height of the surface of the material;

defining a zero plane, ZP, representing an original surface of the material by setting ZL value as a zero level in the CDS_L;

calculating a roughness value, Ra1, of the material surface from CDS2_L;

generating a complete data set of indent, CDSI, from the CDS1_L by finding all data in the CDS1 L below the zero plane, minus the Ra1;

selecting a sphere shape by fitting the shape of the sphere to all data values in CDSI using the least squares method, wherein a diameter of the sphere is referred to as Sphere_1 and an origin of the sphere on the X-Y plane is referred to as Origin of Sphere_1;

adjusting the CDS_L such that all data in the CDS_L are centered on the Origin of Sphere_1;

calculating a second diameter, Diameter_2, of an intersection of the zero plane, ZP, and the sphere;

calculating a first Hardness Brinell value, HB_1, based on the second diameter Diameter_2.

2. The method according to claim 1, wherein processing the set of raw data comprises removing outliers in the set of raw data by a criteria of more than three standard deviations outside a mean value of the set of raw data, and filling missing and removed data with a mean value of a number of its nearest neighbours' values in the set of raw data.

3. The method according to claim 1, wherein the tilting factor is calculated by a least squares method in the X-Y coordinate plane.

4. The method according to claim 1, further comprising calculating a residual of the difference from Sphere_1 and the CDSI, wherein the residual volume has a similar shape as a coin and is referred as coin_1, and calculating a roughness of the coin_1, Ra_coin1.

5. The method according to claim 1, further comprising generating a profile of an indent from the CDS_L, wherein the profile comprises a load and a ball diameter used to create the indent, a part of the complete data set CDS representing half shape of the indent and the calculated first Hardness Brinell value, HB_1.

6. The method according to claim 5, further comprising generating a statistical database comprising profiles of indents measured and generated from a large volume of materials with different hardness levels, wherein the indents are created by different load and ball size combinations on different materials.

7. The method according to claim 6, further comprising including corresponding profiles of indents measured and generated by a standard 2D Brinell hardness measurement into the statistical database and including data on chemistry, thickness, and condition of the material into the statistical database.

8. The method according to claim 7, further comprising estimating any one of the material properties such as yield strength, e-modulus, deformation hardening and level of plasticity using Finite Element Analysis (FEA) based on the statistical database of profiles and by backward engineering.

9. The method according to claim 5, further comprising indicating variations in a process of making the material by checking if a profile of an indent is within a certain limit.

10. The method according to claim 1, further comprising converting the HB_1 to a second Hardness Brinell value, HB_2, wherein both HB_1 and HB_2 fulfil ISO 6506-1: 2006 standard, whereas the HB_2 value corresponds to the same average value of hardness measured by a traditional standard 2D Brinell hardness evaluation method.

11. A method for measuring a hardness value of a material, the method comprising:

creating, via an indenter with a load, an indent on a surface of the material;

measuring, via an instrument, a 3D topography of the indent and generating a set of raw data comprising 3D data values in X-Y-Z direction;

inputting the set of raw data into a processing unit, wherein the processing unit comprises computer program code for performing a method, that when executed by the processing unit, causes the processing unit to:

generate a complete data set, CDS, from the set of raw data by processing the set of raw data based on measuring quality of the instrument;

convert the CDS to a two-dimensional, 2D, data set, CDS_2D, in an X-Y coordinate plane representing a 2D picture having a circle in the middle representing the indent;

divide the CDS into two data sets by using the X-Y coordinate of the circle in CDS_2D, a first data set, CDS1, comprising data inside the circle, a second data set, CDS2, comprising the remaining data outside the circle;

calculate a tilting factor based on the CDS2 in the X-Y coordinate plane;

generate a levelled complete data set, CDS_L, by adjusting the CDS with the tilting factor and regenerate from CDS_L, a first levelled data set, CDS1_L, comprising data inside the circle, a second levelled data set, CDS2_L, comprising the remaining data outside the circle;

calculate a mean value, ZL, in Z-direction from the CDS2_L, wherein the ZL represents an average height of the surface of the material;

define a zero plane, ZP, representing an original surface of the material by setting ZL value as a zero level in the CDS_L;

calculate a roughness value, Ra1, of the material surface from CDS2_L;

generate a complete data set of indent, CDSI, from the CDS1_L by finding all data in the CDS1_L below the zero plane, minus the Ra1;

select a sphere shape by fitting the shape of the sphere to all data values in CDSI using the least squares method, wherein a diameter of the sphere is referred to as Sphere_1 and an origin of the sphere on the X-Y plane is referred to as Origin of Sphere_1;

adjust the CDS_L such that all data in the CDS_L are centered on the Origin of Sphere_1;

calculate a second diameter, Diameter_2, of an intersection of the zero plane, ZP, and the sphere;

calculate a first Hardness Brinell value, HB_1, based on the second diameter Diameter_2; and output results of the measurement.

12. The method according to claim 11, wherein, when executed, the program code further causes the processor to output any one of a first Hardness Brinell value HB_1 and a second Hardness Brinell value HB_2 or both as the results of the measurement, wherein the HB 2 value is converted from the HB 1 value and both HB_1 and HB_2 fulfil ISO 6506-1:2006 standard, whereas the HB 2 value corresponds to the same average value of hardness measured by a traditional standard 2D Brinell hardness evaluation method.

13. The method according to claim 11, wherein, when executed, the program code further causes the processor to check quality of a measurement by checking the parameter Ra_coin1.

14. The method according to claim 11, wherein, when executed, the program code further causes the processor to output an indicator, indicating variations in a process of making the material.

15. A test system for measuring a hardness value of a material comprising:

a load with an indenter for creating an indent on a surface of the material;

a 3D measurement instrument for measuring a 3D topography of the indent and generating a set of raw data comprising 3D data values in X-Y-Z direction;

a processing unit comprising computer program code for performing a method, when executed in the processing unit, comprising:

generating a complete data set, CDS, from the set of raw data by processing the set of raw data based on measuring quality of the instrument;

converting the CDS to a two-dimensional, 2D, data set, CDS_2D, in an X-Y coordinate plane representing a 2D picture having a circle in the middle representing the indent;

dividing the CDS into two data sets by using the X-Y coordinate of the circle in CDS_2D, a first data set, CDS1, comprising data inside the circle, a second data set, CDS2, comprising the remaining data outside the circle;

calculating a tilting factor based on the CDS2 in the X-Y coordinate plane;

generating a levelled complete data set, CDS_L, by adjusting the CDS with the tilting factor and regenerating from CDS_L, a first levelled data set, CDS1_L, comprising data inside the circle, a second levelled data set, CDS2_L, comprising the remaining data outside the circle;

calculating a mean value, ZL, in Z-direction from the CDS2 L, wherein the ZL represents an average height of the surface of the material;

defining a zero plane, ZP, representing an original surface of the material by setting ZL value as a zero level in the CDS_L;

calculating a roughness value, Ra1, of the material surface from CDS2_L;

generating a complete data set of indent, CDSI, from the CDS1_L by finding all data in the CDS1_L below the zero plane, minus the Ra1;

selecting a sphere shape by fitting the shape of the sphere to all data values in CDSI using the least squares method, wherein a diameter of the sphere is referred to as Sphere_1 and an origin of the sphere on the X-Y plane is referred to as Origin of Sphere_1;

adjusting the CDS_L such that all data in the CDS_L are centered on the Origin of Sphere_1;

calculating a second diameter, Diameter_2, of an intersection of the zero plane, ZP, and the sphere;

calculating a first Hardness Brinell value, HB_1, based on the second diameter Diameter_2.

16. The test system according to claim 15, wherein the indenter has a shape of a ball.

17. The test system according to claim 15, further comprising a display for outputting and indicating measurement results.

18. The test system according to claim 15, is implemented as an in-line automatic hardness measuring station together with a production line of the material.

* * * * *